US011521191B2

(12) United States Patent
Kuroda et al.

(10) Patent No.: US 11,521,191 B2
(45) Date of Patent: Dec. 6, 2022

(54) USE MANAGEMENT SYSTEM FOR MOVING BODY

(71) Applicant: HONDA MOTOR CO., LTD., Tokyo (JP)

(72) Inventors: Kosuke Kuroda, Wako (JP); Go Nakamoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 83 days.

(21) Appl. No.: 16/934,173

(22) Filed: Jul. 21, 2020

(65) Prior Publication Data

US 2020/0349542 A1 Nov. 5, 2020

Related U.S. Application Data

(63) Continuation of application No. PCT/JP2018/046580, filed on Dec. 18, 2018.

(30) Foreign Application Priority Data

Jan. 31, 2018 (JP) ............................ JP2018-015456

(51) Int. Cl.
*G06Q 20/00* (2012.01)
*G06Q 20/14* (2012.01)

(52) U.S. Cl.
CPC .................................. *G06Q 20/145* (2013.01)

(58) Field of Classification Search
CPC .................................................... G06Q 20/145
See application file for complete search history.

(56) References Cited

U.S. PATENT DOCUMENTS 9,371,007 B1 * 6/2016 Penilla ................. G06Q 20/145
2005/0086100 A1 * 4/2005 Yanagisawa ........... G07B 15/02
705/13

(Continued)

FOREIGN PATENT DOCUMENTS

JP 2002041613 A 2/2002
JP 2002150179 A 5/2002

(Continued)

OTHER PUBLICATIONS

NFC in cell phones: The new paradigm for an interactive world [Near-Field Communications] Published in: IEEE Communications Magazine (vol. 47, Issue: 6, pp. 22-28) Authors: Jeffrey Fischer (Year: 2009).*

(Continued)

*Primary Examiner* — Bruce I Ebersman
*Assistant Examiner* — John A Anderson
(74) *Attorney, Agent, or Firm* — Thomas | Horstemeyer, LLP

(57) ABSTRACT

A use management system comprises a moving body on which a user rides; a storage medium and an information processing apparatus, wherein the medium stores identification, a predetermined route and movement information, and the moving body includes a first reader/writer for acquiring information from the storage medium and records information onto the storage medium, starts recording the movement information regarding the moving body when the use of the moving body is started, records the movement information when the moving body deviates from the route, and writes the recorded movement information onto the storage medium when the use of the moving body is ended, and the information processing apparatus includes a second reader/writer for acquiring information from the storage medium and charges an additional fee to a user based on the movement information.

4 Claims, 11 Drawing Sheets

(56) References Cited

U.S. PATENT DOCUMENTS

| | | | |
|---|---|---|---|
| 2011/0119200 | A1 | 5/2011 | Hatta |
| 2020/0013112 | A1 | 1/2020 | Cho |

FOREIGN PATENT DOCUMENTS

| | | | | |
|---|---|---|---|---|
| JP | 2011108092 | A | | 6/2011 |
| JP | 2011130560 | | * | 10/2011 |
| JP | 2012244785 | | * | 8/2012 |
| JP | 2013073339 | A | | 4/2013 |
| JP | 2013030194 | | * | 12/2013 |
| JP | 2017167612 | A | | 9/2017 |
| JP | 2017199236 | A | | 11/2017 |
| WO | 2013047498 | A1 | | 4/2013 |
| WO | 2017159598 | A1 | | 9/2017 |

OTHER PUBLICATIONS

Cyber-physical vehicle tracking system: Requirements for using a radio frequency identification technique Published in: 2015 IEEE International Conference on Electro/Information Technology (EIT) (pp. 552-557) Authors: Dietmar P.F. Moller • Tatiana Deriyenko • Hamid Vakilzadian (Year: 2015).*

Indian Office Action for Indian Patent Application No. 202017035581 dated Nov. 18, 2021.

* cited by examiner

250
IC CARD
254
EV PASS-SPECIFIC INFORMATION
2541
2542
2543
2544
2545
2546
SECTION INFORMATION (ROUTE)
VALIDITY PERIOD
EV ID
EV ALTERNATIVE ROUTE
PAYMENT TIME
TEMPORARY MEMORY
251
CARD ID
252
ELECTRONIC MONEY INFORMATION
253
RAILWAY COMPANY-SPECIFIC INFORMATION

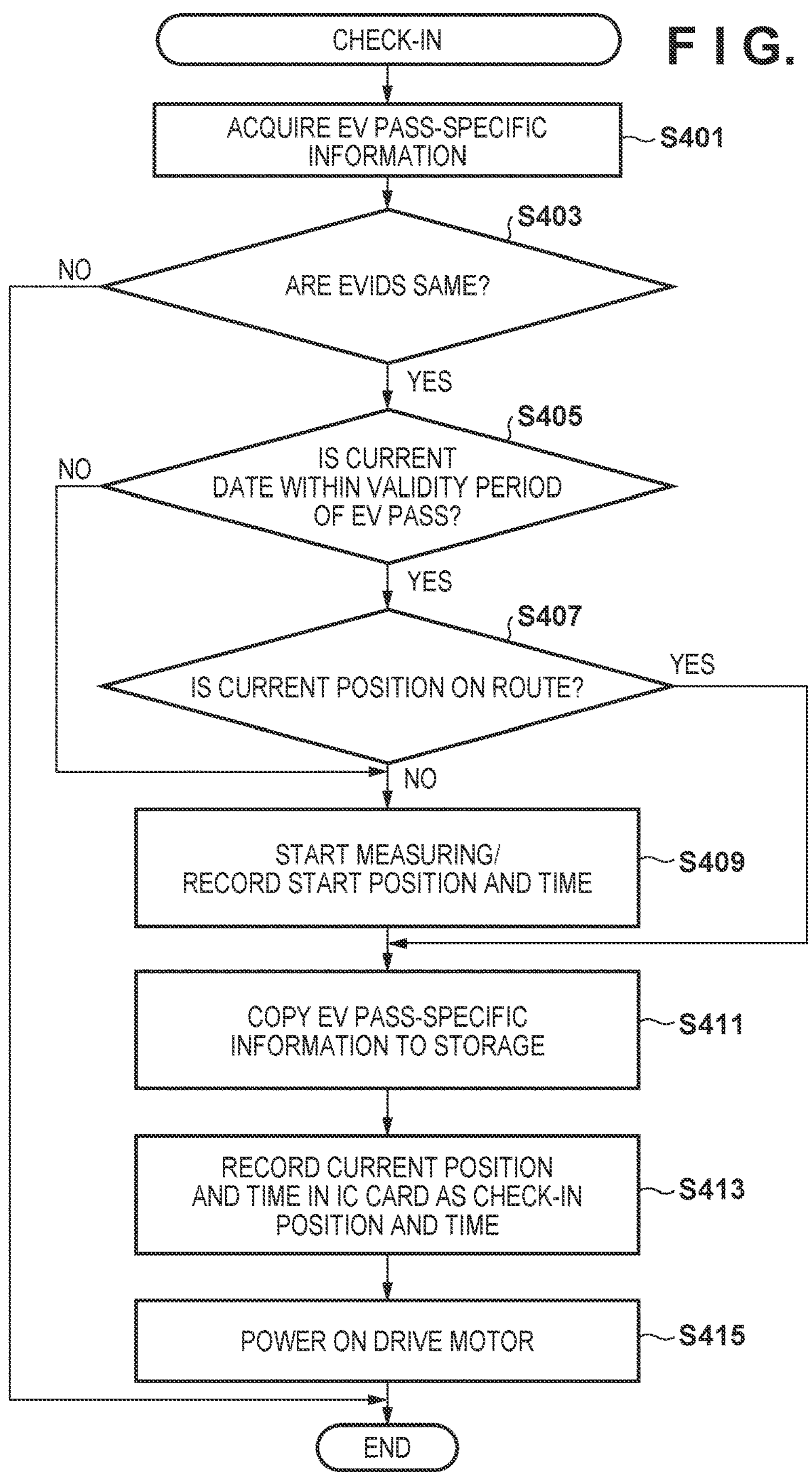
FIG. 4
CHECK-IN
ACQUIRE EV PASS-SPECIFIC INFORMATION
S401
S403
ARE EVIDS SAME?
NO
YES
S405
IS CURRENT DATE WITHIN VALIDITY PERIOD OF EV PASS?
NO
YES
S407
IS CURRENT POSITION ON ROUTE?
YES
NO
START MEASURING/ RECORD START POSITION AND TIME
S409
COPY EV PASS-SPECIFIC INFORMATION TO STORAGE
S411
RECORD CURRENT POSITION AND TIME IN IC CARD AS CHECK-IN POSITION AND TIME
S413
POWER ON DRIVE MOTOR
S415
END

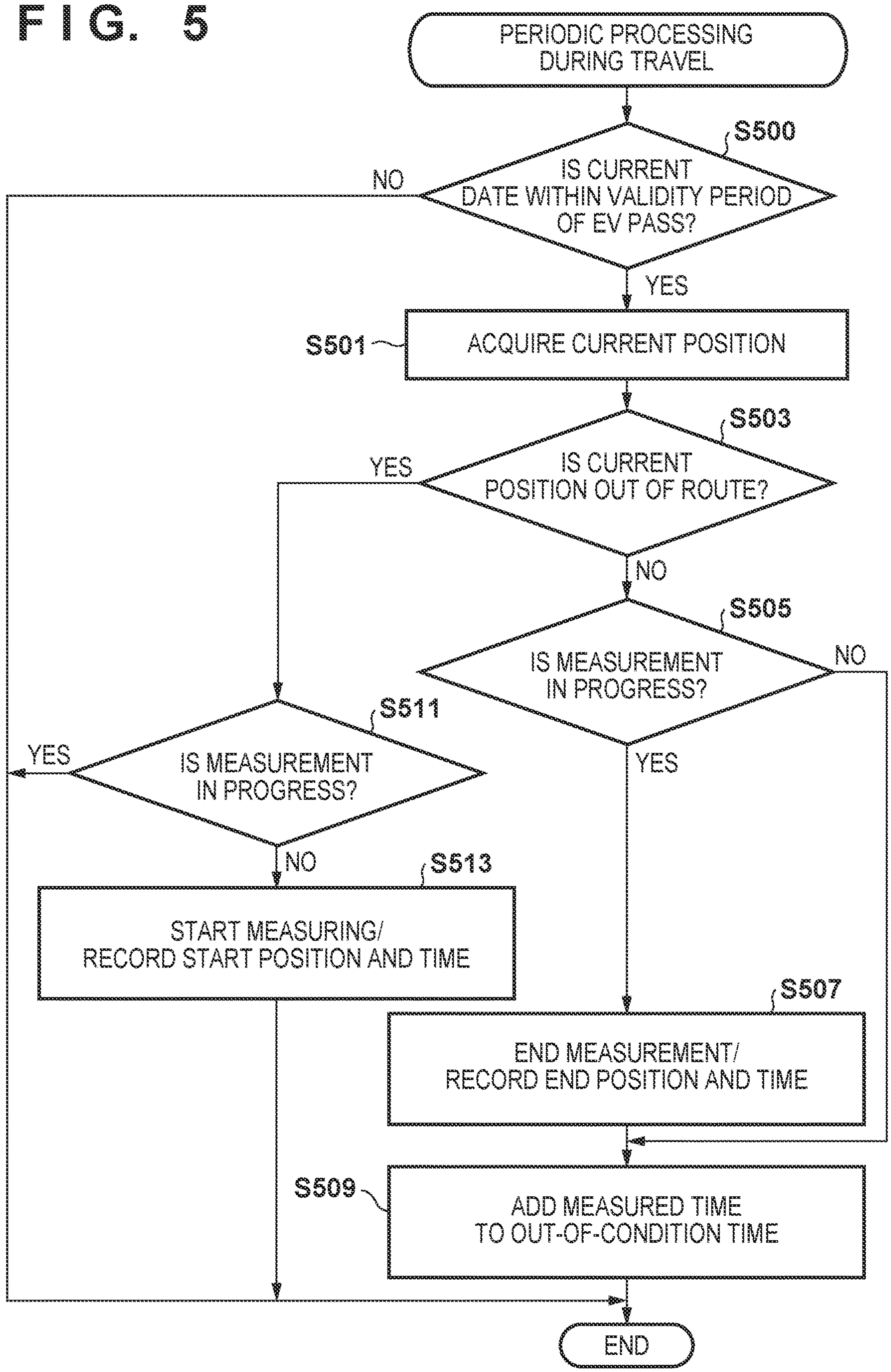
F I G. 5
PERIODIC PROCESSING DURING TRAVEL
S500
IS CURRENT DATE WITHIN VALIDITY PERIOD OF EV PASS?
NO
YES
S501
ACQUIRE CURRENT POSITION
S503
IS CURRENT POSITION OUT OF ROUTE?
YES
NO
S505
IS MEASUREMENT IN PROGRESS?
NO
YES
S511
IS MEASUREMENT IN PROGRESS?
YES
NO
S513
START MEASURING/ RECORD START POSITION AND TIME
S507
END MEASUREMENT/ RECORD END POSITION AND TIME
S509
ADD MEASURED TIME TO OUT-OF-CONDITION TIME
END

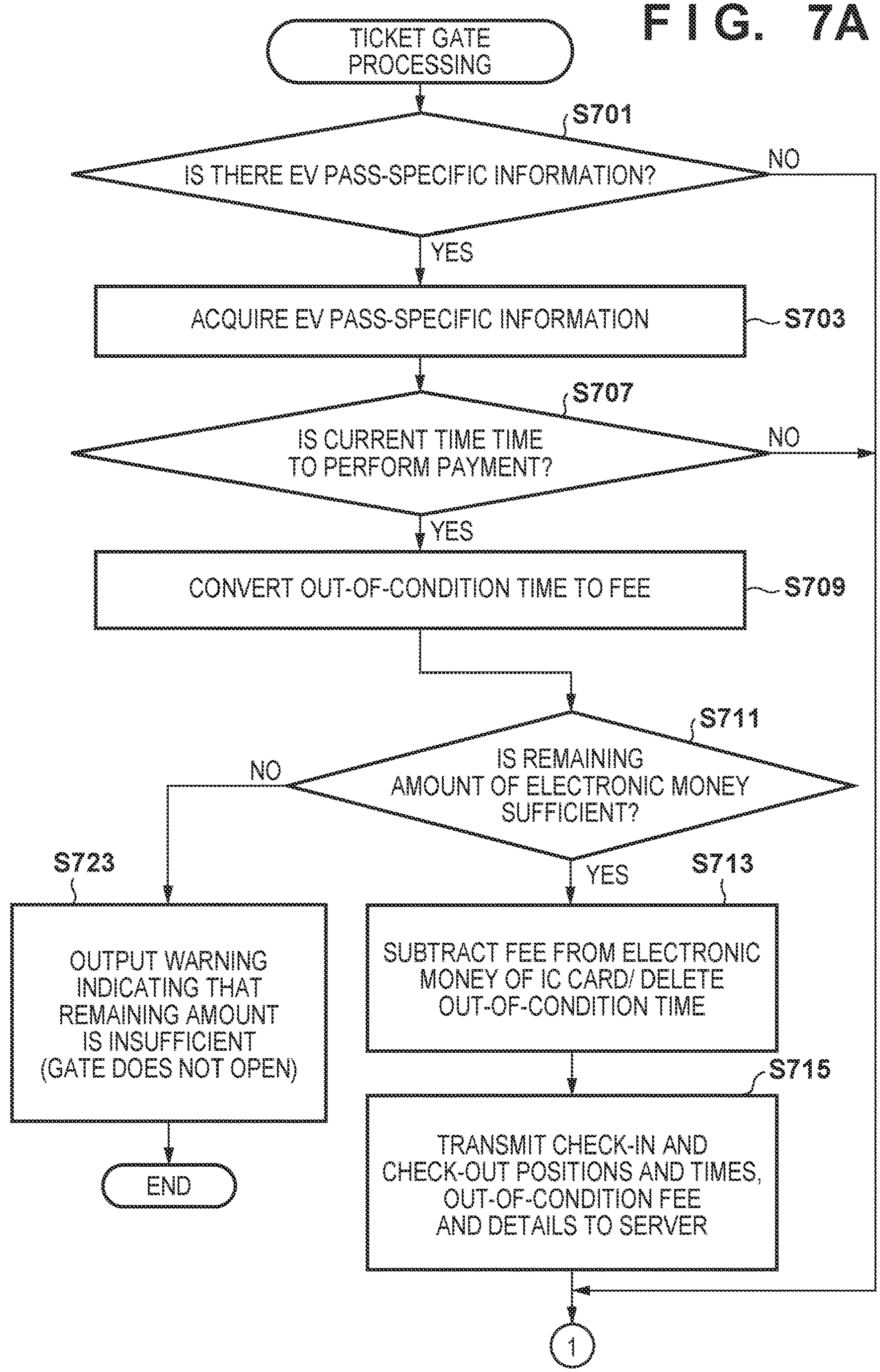
FIG. 7A
TICKET GATE PROCESSING
S701
IS THERE EV PASS-SPECIFIC INFORMATION?
NO
YES
ACQUIRE EV PASS-SPECIFIC INFORMATION
S703
S707
IS CURRENT TIME TIME TO PERFORM PAYMENT?
NO
YES
CONVERT OUT-OF-CONDITION TIME TO FEE
S709
S711
IS REMAINING AMOUNT OF ELECTRONIC MONEY SUFFICIENT?
NO
YES
S723
OUTPUT WARNING INDICATING THAT REMAINING AMOUNT IS INSUFFICIENT (GATE DOES NOT OPEN)
END
S713
SUBTRACT FEE FROM ELECTRONIC MONEY OF IC CARD/ DELETE OUT-OF-CONDITION TIME
S715
TRANSMIT CHECK-IN AND CHECK-OUT POSITIONS AND TIMES, OUT-OF-CONDITION FEE AND DETAILS TO SERVER
1

USE MANAGEMENT SYSTEM FOR MOVING BODY

CROSS-REFERENCE TO RELATED APPLICATION(S)

This application is a continuation of International Patent Application No. PCT/JP2018/046580 filed on Dec. 18, 2018, which claims priority to and the benefit of Japanese Patent Application No. 2018-015456 filed on Jan. 31, 2018, the entire disclosures of which are incorporated herein by reference.

TECHNICAL FIELD

The present invention relates to a use management system for a moving body, the use management system providing a user with a convenient personal means of transportation and allowing the user to use the personal means of transportation as if it were a public transportation system.

BACKGROUND ART

In the suburbs, many railway users do not have their homes within walking distance from a train station, and such users often use a bicycle, a bus, or a private car to travel to the station. A technology for improving convenience when a user uses a railway and a vehicle in combination is proposed in PTL1 for example.

CITATION LIST

Patent Literature

PTL1: Japanese Patent Laid-Open No. 2017-199236
PTL2: Japanese Patent Laid-Open No. 2017-167612

SUMMARY OF INVENTION

Technical Problem

However, the punctuality of buses is relatively low, and there is a concern that the punctuality of buses may be even lower especially in rush hours during which the most people commute to or from school or work. Also, regarding private cars, there is a concern that congestion may occur due to concentration of traffic, and it is also necessary to secure a parking lot around the station. Bicycles are convenient, but not suitable for long distances, and are not suitable for summer due to the required amount of activity.

In addition, motorcycles and private cars require high initial costs, and even if they are used as commuting means, there are not many cases where transportation expenses are paid for them.

The present invention has been made in view of the above-described conventional example, and aims to provide a use management system for a moving body, the use management system providing a user with a convenient personal means of transportation and allowing the user to use the personal means of transportation as if it were a public transportation system.

Solution to Problem

To achieve the above-described aim, the present invention has the following configuration. That is, provide is a use management system for a moving body, comprising:

a moving body on which a user rides;

a storage medium that can store identification information, contract information that is associated with the identification information and includes a predetermined route, and movement information regarding the moving body, and an information processing apparatus, wherein the moving body includes a first reader/writer for acquiring information from the storage medium and records information onto the storage medium.

starts recording the movement information regarding the moving body upon the identification information being acquired by the first reader/writer at a first point in time at which the use of the moving body is started, records the movement information when the moving body deviates from the route, and writes the recorded movement information onto the storage medium using the first reader/writer upon the identification information being acquired by the first reader/writer at a second point in time at which the use of the moving body is ended, and the information processing apparatus includes a second reader/writer for acquiring information from the storage medium and records information onto the storage medium, and charges an additional fee to a user that is associated with the identification information, based on the movement information, upon acquiring the movement information from the storage medium.

Advantageous Effects of Invention

The present invention provides a user with a convenient personal means of transportation, and allows the user to use the personal means of transportation as if it were a public transportation system.

Other features and advantages of the present invention will be apparent from the following description taken in conjunction with the accompanying drawings. Note that the same reference numerals denote the same or like components throughout the accompanying drawings.

BRIEF DESCRIPTION OF DRAWINGS

The accompanying drawings are included in and form part of the specification, and are used to illustrate embodiments of the present invention, and to illustrate the principles of the present invention, together with the descriptions thereof.

FIG. 4 is a flowchart for a check-in processing procedure performed by a two-wheeled EV according to a first embodiment.

FIG. 5 is a flowchart for a periodic processing procedure during travel, performed by the two-wheeled EV according to the first embodiment.

FIG. 7A is a flowchart for a payment processing procedure performed by the automatic ticket gate according to the first embodiment.

DESCRIPTION OF EMBODIMENTS

Overview of Use Management System for Moving Body

Figure 1:
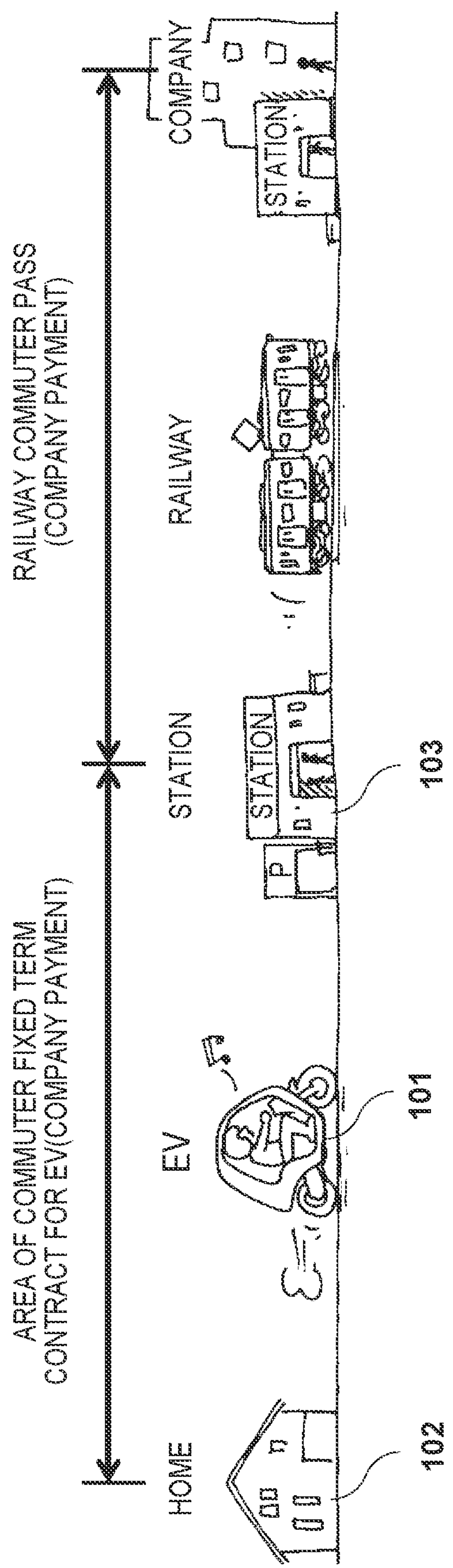
FIG. 1 is a diagram showing an overview of an example of a use management system for a moving body according to an embodiment.

FIG. 1 shows an example of use of a moving body management system according to an embodiment. Although the following describes a case in which the system uses a two-wheeled electric vehicle (a two-wheeled EV, abbreviated as an EV) as a moving body, any kind of moving body may be used as long as the system has the function of recording the moving state of the moving body. Desirably, the EV has a roof even if it is simple. In FIG. 1, the user rents an EV 101 from a railway company, for example, and uses it to commute between a home 102 and a railway station 103. A battery charging facility is provided at the home 102, the railway station 103, or the like. To use the EV, the user performs a check-in operation using a commuter pass (hereinafter also referred to as a pass) when riding in a car and start using the EV, and performs a check-out operation when getting out of the EV. The user, who has traveled from the home 102 and has arrived at the railway station 103, parks the EV 101 in a parking space, puts the commuter pass into an automatic ticket gate provided at the station 103 to ride on the train, and gets off the train at the destination. When returning home, the user takes the opposite route. Here, the user pays the rental fee for the EV 101 by purchasing a commuter pass for the EV 101 (also referred to as an EV pass). The EV pass is stored in the same card as the railway commuter pass, for example. Also, the fee for the EV pass is determined according to the distance between the home 102 and the railway station 103, for example. An EV pass defines the conditions of use of an EV. If the user uses the EV 101 beyond the conditions of use, an additional fee is charged to the user. Fee adjustment regarding the additional fee is performed when a commuter pass such as an IC card is put into an automatic ticket gate provided at the railway station 103, by the automatic ticket gate reading the information in the EV pass. Fee adjustment is realized through payment from electronic money stored in the commuter pass, for example. Alternatively, the user can pay off the amount in full, using an affiliated credit card. Note that fee adjustment may be performed by a server instead of the automatic ticket gate, the server receiving the information in the EV pass through the automatic ticket gate.

First Embodiment

The following describes constituent elements for realizing the above-described use management system for a moving body.

EV Control Unit

Figure 2A:
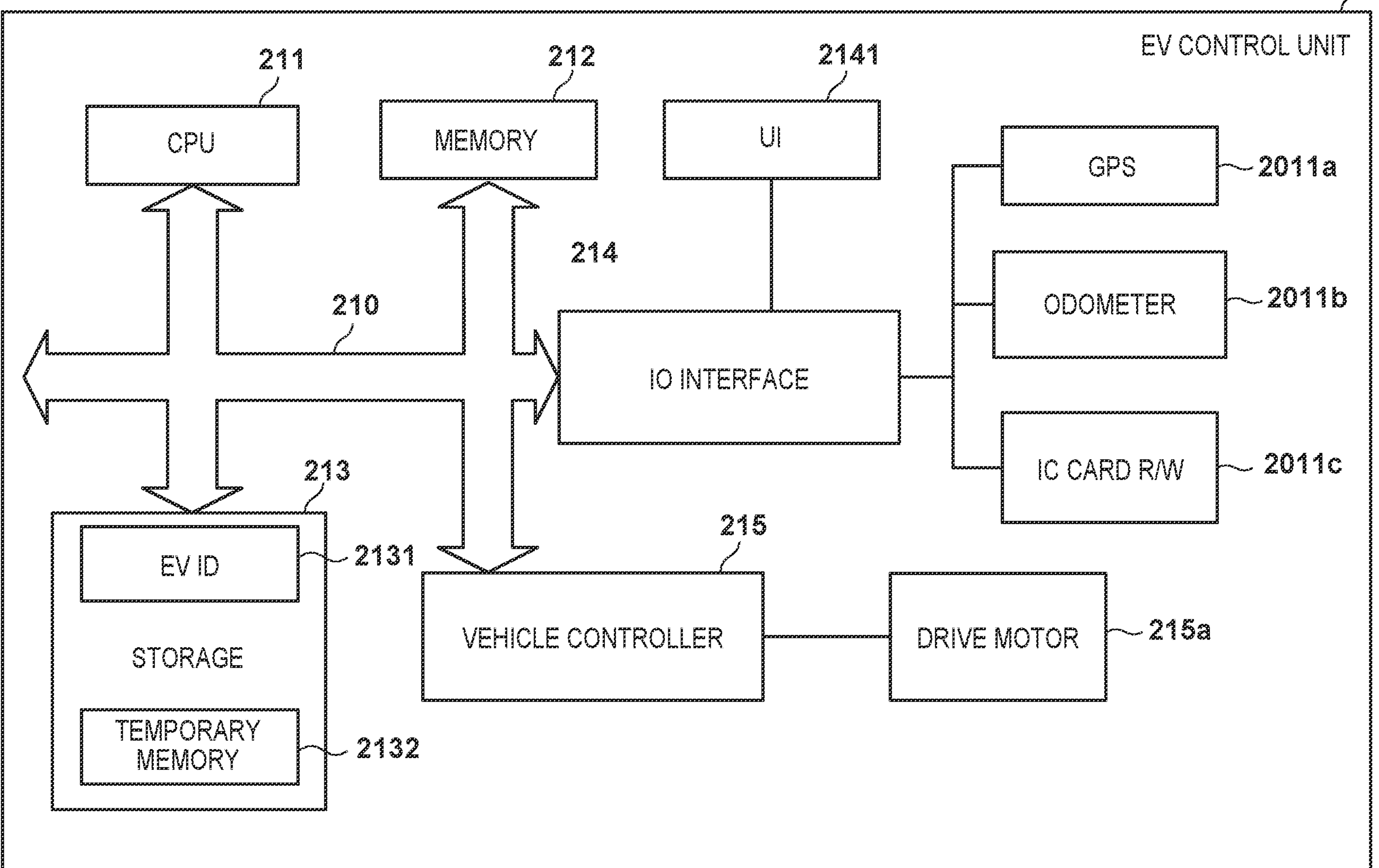
FIG. 2A is a diagram showing an example of a configuration for controlling a two-wheeled EV according to an embodiment.

FIG. 2A is a block diagram showing an example of a configuration of an EV control unit 200 provided in the EV 101. In the EV control unit 200, a CPU 211 executes a program loaded onto a memory 212 or the like, and thus the entirety thereof is controlled. A storage area is secured in the memory 212, in which the state of movement (also referred to as movement information) is to be stored during travel of the EV in addition to programs. A storage 213 is a nonvolatile memory such as a flash (registered trademark) memory, and stores an EVID 2131 that is identification information specific to the EV 101. The storage 213 also has a temporary memory 2132 for storing a copy of EV pass-specific information or the like stored in an IC card 250 described below, or movement information that is the basis for an additional fee. An input/output interface (IO interface) 214, as well as the CPU 211 and the memory 212, is connected to a bus 210, and a GPS 2011*a*, an electronic odometer 2011*b*, and an IC card reader/writer (IC card R/W) 2011*e* for reading data from, and writing data to, the IC card 250 are also connected to the IO interface 214. A user interface (UI) 214 with which the user performs input and output operations is connected to the IO interface 214. Note that the UI 2141 need not necessarily be provided. A vehicle controller 215 for controlling a drive motor 215*a* of the EV 101 is also connected to the bus 210. The vehicle controller 215 controls operations of the drive motor 215*a* under the control of the CPU 211 in response to an operation of a throttle (not shown), and controls the CPU 211 to power ON and OFF the drive motor 215*a*.

IC Card

Figure 2B:
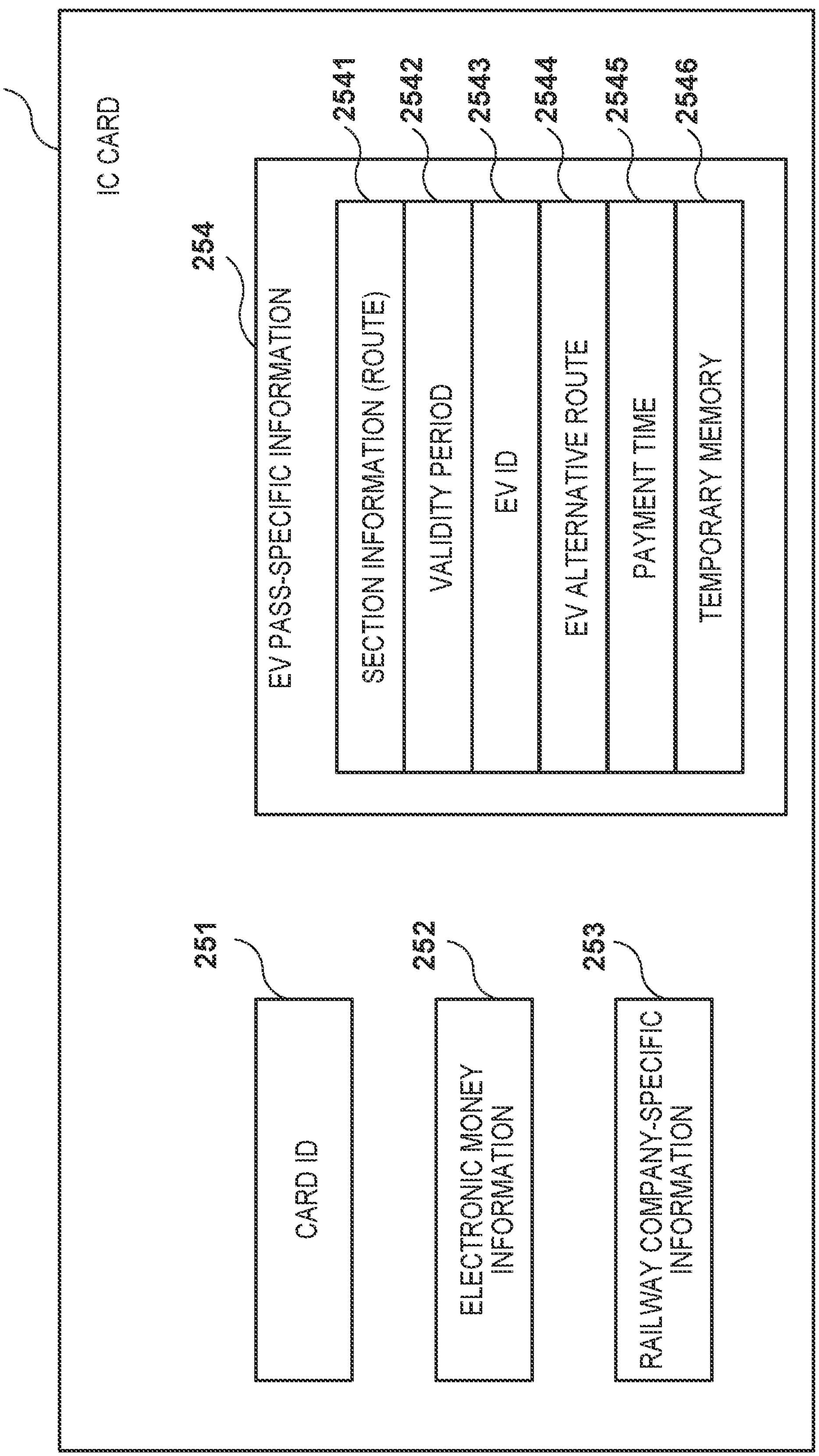
FIG. 2B is a diagram showing an example of information held by a magnetic commuter pass or an IC card commuter pass.

FIG. 2B is a block diagram showing information stored in the IC card 205 that is used as a commuter pass. The IC card 250 is a Felica (registered trademark) card that is used for Suica (registered trademark) or the like, and has a rewritable nonvolatile memory. The IC card is also provided with a communication antenna for communicating with a CPU and an IC card R/W such as the IC card R/W 2011*c*, a power supply unit for obtaining power through electromagnetic induction, and so on. However, these units are omitted here because the essence of the IC card is the information stored therein.

The IC card 250 holds a card ID 251 for uniquely identifying the IC card. The IC card 250 also holds electronic money information 252 that indicates the balance of electronic money, railway company-specific information 253 that includes information regarding a railway commuter pass or the like, and EV pass-specific information 254 that includes information regarding the EV commuter pass. Upon the IC card 250 being put into the automatic ticket gate, the ride is identified as a ride using the commuter pass, based on the information regarding the railway pass held in the railway company-specific information 253, and, for example, the fee is adjusted regarding a ride outside the designated section of the commuter pass.

The EV pass-specific information 254 includes section information 2541 that indicates the designated section, and a route, if necessary, of the EV pass, a validity period 2542 of the EV pass, and an EVID 2543 that is identification information specific to the EV pass. The route is necessary if the conditions for the EV pass require that the EV travel through a predetermined route as in the first embodiment, for example. The route is unnecessary if it is not designated by the conditions. The EV pass-specific information 254 also includes an EV alternative route 2544 that indicates the route when an alternative transportation system is available for the section where the EV 101 is used, a payment time 2545 that indicates a payment time such as immediate payment or monthly payment, and a temporary memory 2546 that is used to exchange information such as movement information between the EV control unit 200 and an automatic ticket gate 301. An IC card that includes the EV pass-specific information 254 is referred to as an EV pass, and an IC card that includes railway company-specific information (including commuter pass information) is referred to as a railway pass. Therefore, the IC card 250 shown in FIG. 2B serves as both an EV pass and a railway pass. Although the IC card 250 serves as both an EV pass and a railway pass in order to illustrate an example in which a transfer is made from the EV 101 to a railway in the present embodiment, the use management system described herein can be realized even if the IC card 250 only serves as an EV pass. Note that the IC card 250 may be in any form as long as it can store EV pass-specific information, and may be a magnetic commuter pass or built into a terminal device such as a smartphone.

Automatic Ticket Gate

Figure 3:
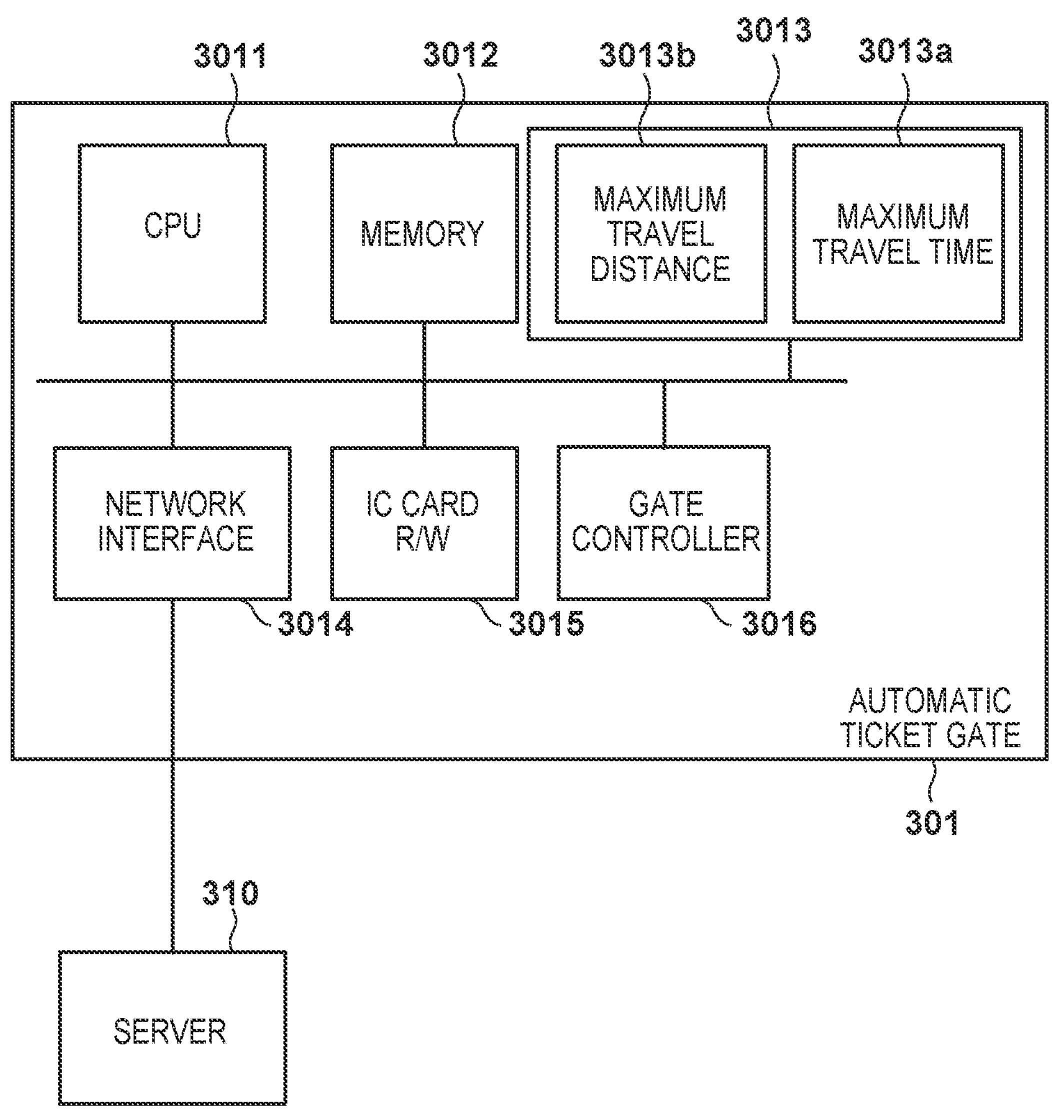
FIG. 3 is a diagram showing an example of a configuration of an automatic ticket gate according to an embodiment.

FIG. 3 shows an example of a configuration of the automatic ticket gate 301 provided at the railway station 103. A CPU 3011, a memory 3012, a storage 3013, a network interface 3014, and so on are components that are commonly provided in a typical information processing apparatus. A server 310 is connected to the network interface 3014. The server 310 includes components that are commonly provided in a typical server computer, and therefore descriptions of the components are omitted. An IC card R/W 3015 and a gate controller 3016 are constituent elements that are specific to the automatic ticket gate. The IC card R/W 3015 is a device for reading and writing data from and to the IC card 250, and has the same functions as the IC card R/W 2011*c*. The gate controller 3016 performs control to open and close a gate that prevents the user from passing therethrough when the ticket is invalid or when the balance of electronic money is insufficient to pay the fee. As described above, the automatic ticket gate 301 can be referred to as an information processing apparatus that has components specific thereto. Although the storage 3013 holds a maximum travel distance 3013*b* or a maximum travel time 3013*a* for each user holding an EV pass, they are used in a second embodiment, which will be described later, and are not particularly necessary in the present invention.

The processing illustrated in FIGS. 4 to 7B is performed by the system with the above-described configuration, and thus the EV use management system according to the present embodiment is realized. Before a description thereof, processing performed to issue an EV pass will be described first. In order for issuance of an EV pass, unlike a rail pass or the like, it is necessary to arrange the EV 101 to be rented. Therefore, when issuing the EV pass, the rental agency (the railway company in this example) arranges the EV 101 to be rented, and registers the EVID 2131 in the storage 213 of the EV control unit 200. Also, the rental agency writes the EV pass-specific information 254, which indicates EV pass contract conditions, into the IC card 250 of the user who uses the EV 101. The section information 2541, the validity period 2542, the EV alternative route 2544, and the payment time 2545 included therein are contract information indicating the conditions determined according to contract between the user and the railway company at the time of issuance of the EV pass. The EVID 2131 of the EV 101 to be rented is recorded to the EVID 2543. Thus, the EV 101 is associated with the IC card 250. For this EV pass, the user pays a fee according to the conditions of use, such as the section to be used and the period of use. Furthermore, as described below, the user pays additional fee if the user uses the EV beyond the conditions of use.

Check-In Processing

Next, check-in processing performed by the EV control unit 200 will be described. FIG. 4 is a flowchart for check-in processing. This processing is performed by the EV control unit 200, especially by the CPU 211. Check-in means that the IC card RW 2011*c* of the EV 101 that is not in a used state reads the EV pass issued in the above-described manner, and registers the start of use. For this purpose, in the EV 101, power is supplied to the EV control unit 200 upon the user performing a power ON operation, and thereafter check-in is accepted. At this stage, power is not supplied to the drive motor, and the EV 101 is not available until check-in completes. After the EV 101 is powered ON, upon the IC card 250 being held over the IC card R/W 2011*c*, power is supplied to the IC card 250 and communication with the IC card R/W 2011*c* is started. The CPU 211 first acquires the EV pass-specific information 254 from the IC card 250 (S401). At this time, processing such as unlocking of a file may also be performed. The EV pass-specific information 254 cannot be acquired if it is not present. Therefore, in such a case, a message indicating the absence of the information may be displayed on the UI 2141, or check-in may be terminated without any processing.

Upon successfully acquiring the EV pass-specific information 254, the CPU 211 compares the EVID 2543 included therein with an EVID 2131 stored in the storage 213 (S403). If the IDs are the same, the user is permitted to use the EV 101. In such a case, the CPU 211 determines whether or not the current date is within the validity period 2542 of the EV pass (S405). The current date may be acquired using the GPS 2011*a*, or using areal time clock (not shown). If the current date is not within the validity period, processing branches to step S409. If it is determined that the current date is within the validity period, the CPU 211 determines whether or not the current position acquired using the GPS 2011*a* is on the route set to the section information 2541 (S407). The route to be set need not be very strict, and may be indicated by an approximate range including the route. For example, coordinate points indicating intersections or the like on the route between the home and the station may be specified, and an area having a predetermined width with respect to the straight line that connects the coordinate points may be set as the route. More simply, for example, an area having a predetermined width relative to the straight line that connects the home and the station and including the actual route may be set as the route. In such a case, a low GPS accuracy is acceptable, and a route is selectable.

If it is determined that the current position is on the route, processing branches to step S411. On the other hand, if the current position is not on the route, or the current date is not within the validity period, measurement of time is started using a timer (not shown). The position and the time at which measurement of time is started is recorded. Such measurement of time is performed in order to measure the period of time during which the EV travels in location that does not meet the conditions determined by the EV pass. That start position and the start time are recorded in order to indicate the details of the additional fee. Then, the EV pass-specific information 254 is copied to the temporary memory 2132 so that it can be referenced later (S411). However, if the memory 212 keeps holding the EV pass-specific information 254, such a copy is unnecessary. Finally, the current position and time are recorded in the temporary memory 2546 of the IC card 250 as check-in position and time (S413). After the check-in, the IC card 250 can be detached from the IC card R/W 2011*c*. Also, when check-in completes, a lamp provided in the UI 2141 may be lit up to indicate the check-in state. If check-in is successful, the drive motor 215*a* is powered ON, and thus the user can use the EV 101 (S415).

Through the above-described procedure, check-in is allowed if the EV pass is valid and meets the conditions. However, if the expiration date has passed, or the contract conditions are not met, it is determined that the EV pass is not used, and the period of time for which travel is made beyond the conditions is measured in order to charge an additional fee. Note that if the user is not associated with the EV and is permitted to use any rental EV, step S403 may be skipped and step S405 may be performed upon the EV pass-specific information 254 being successfully acquired.

Periodic Processing During Travel

After check-in is successfully performed, the EV 101 can start travelling. During travel, the EV control unit 200 periodically perform the processing shown in FIG. 5. The execution intervals may be set within the range of one second to several seconds, for example. First, the EV control unit 200 determines whether or not the EV pass is valid, i.e. whether or not the current date is within the validity period (S500). If the current data is not within the validity period, processing is terminated. On the other hand, if the current date is within the validity period, the current position is acquired from the GPS 2011*a* (S501). Then, the EV control unit 200 determines whether or not the current position is out of the route (S503). This determination may be performed in the same manner as in step S407. If it is determined that the current position is within the route, the EV control unit 200 determines whether or not the period of time from when the deviation from the conditions occurred is being measured (S505). If the period is being measured, the measurement of time is terminated because the EV has returned to a position that meets the conditions, and the EV control unit 200 records the current position and time (S507). The measured time is added to an out-of-condition time secured in the memory 212 or the storage 213, for example (S509). The initial value of this value is 0. On the other hand, if it is determined in step S503 that the current position is out of the route, the EV control unit 200 also determines whether or not the period of time is being measured (S511). If the period of time is not being measured, the EV control unit 200 starts measuring the time and records the position and the time (S513). If the period of time is not being measured, processing is terminated. Through this procedure, it is possible to total the period of time from when the deviation from the conditions determined by the contract occurred while the EV 101 is travelling using a valid EV pass. The information recorded in, for example, the memory 212 or the temporary memory 2132 through the procedure shown in FIG. 5 is the movement information regarding movement that does not meet the contract.

Check-Out Processing

Next, check-out processing performed when the use of the EV 101 is terminated will be described with reference to FIG. 6. This processing is performed by the EV control unit 200, especially by the CPU 211. Check-out means that the IC card R/W 2011*c* of the EV 101 that is in a used state reads the EV pass, and registers the end of use. Upon the IC card 250 being held over the IC card R/W 2011*c* of the EV 101 that is in a powered state, power is supplied to the IC card 250 and communication with the IC card RW 2011*c* is started. The CPU 211 first acquires the EV pass-specific information 254 from the IC card 250 (S601). Upon successfully acquiring the EV pass-specific information 254, the CPU 211 compares the EVID 2543 included therein with the EVID 2131 stored in the storage 213 (S603). If the IDs are the same, the measurement of the out-of-condition use time is terminated, and the current position and time are recorded (S605). If the measurement of time is not being performed, step S605 is skipped.

Next, after adding the measured time to the out-of-condition time, the CPU 211 copies the cumulative value of the out-of-condition time recorded in the storage 213 or the memory 212, the respective start positions and the respective start times and the respective end positions and the respective end times that have been recorded, to the temporary memory 2546 of the IC card 250 (S609). That is to say, movement information regarding movement that does not meet the contract is copied to the IC card 250. At this time, if a copy of information is recorded in the storage 213, the information is deleted. If such information is stored in the memory 212, it disappears when power is turned off. Therefore, such information may be left untreated. Also, the copy of the EV pass-specific information in the storage 213 is deleted (S611). Then, the current position and time are recorded in the IC card 250 as a check-out position and time (S613). Finally, the main power is turned off so that the drive motor 215*a* is also turned off (S615). Although nothing is performed when the EVIDs do not match in step S603, an error may be displayed. Through this processing, the positions and points in time at which check-in and check-out are performed, and the cumulative value of the out-of-condition time of the travel performed therebetween can be stored in the IC card 250. Note that, from check-out to check-in, no fee is charged to the user even if the user is out of the route determined by the conditions of use.

Ticket Gate Processing

Figure 6:
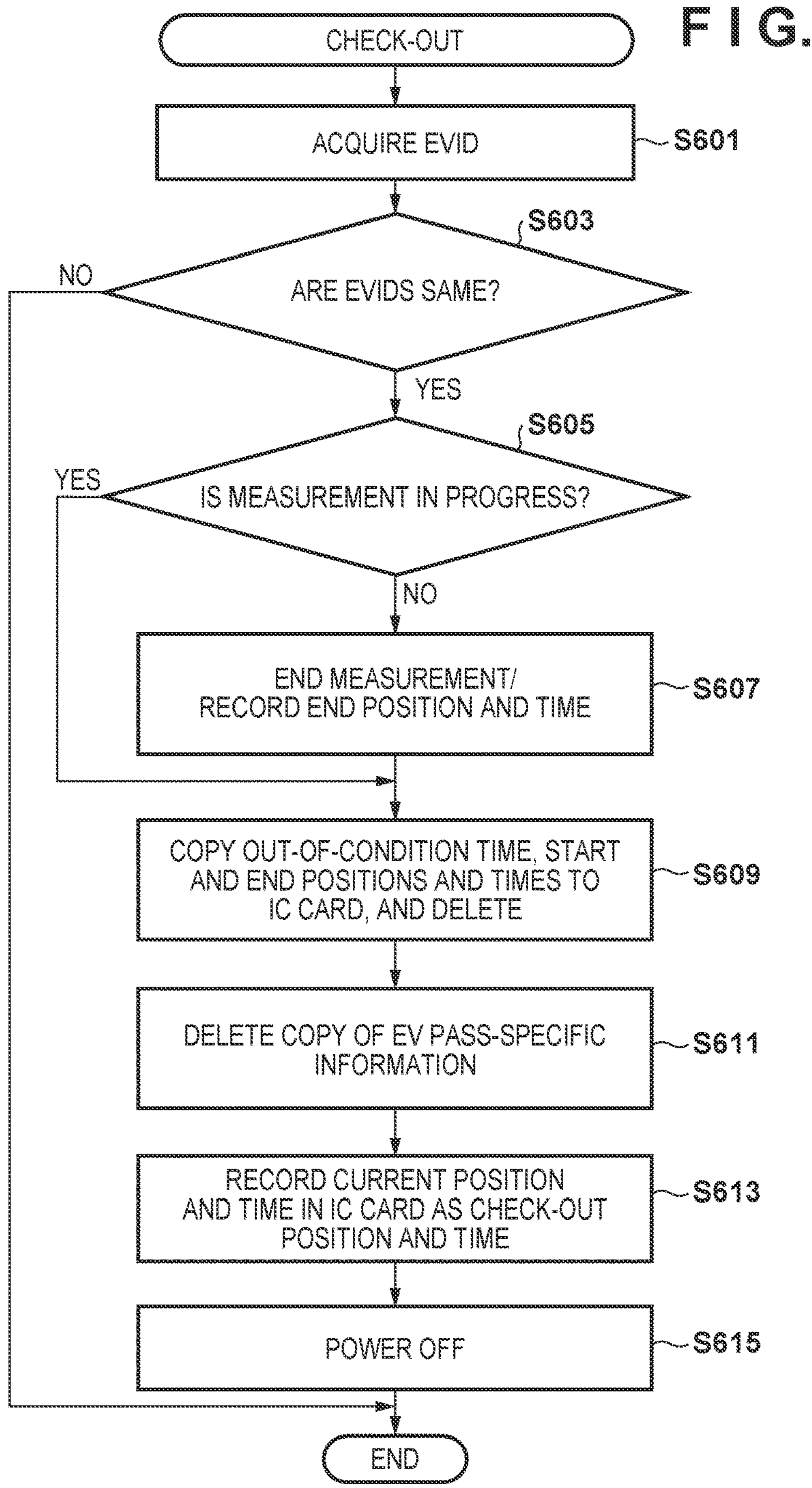
FIG. 6 is a flowchart for a check-out processing procedure performed by the two-wheeled EV according to the first embodiment.
Figure 7B:
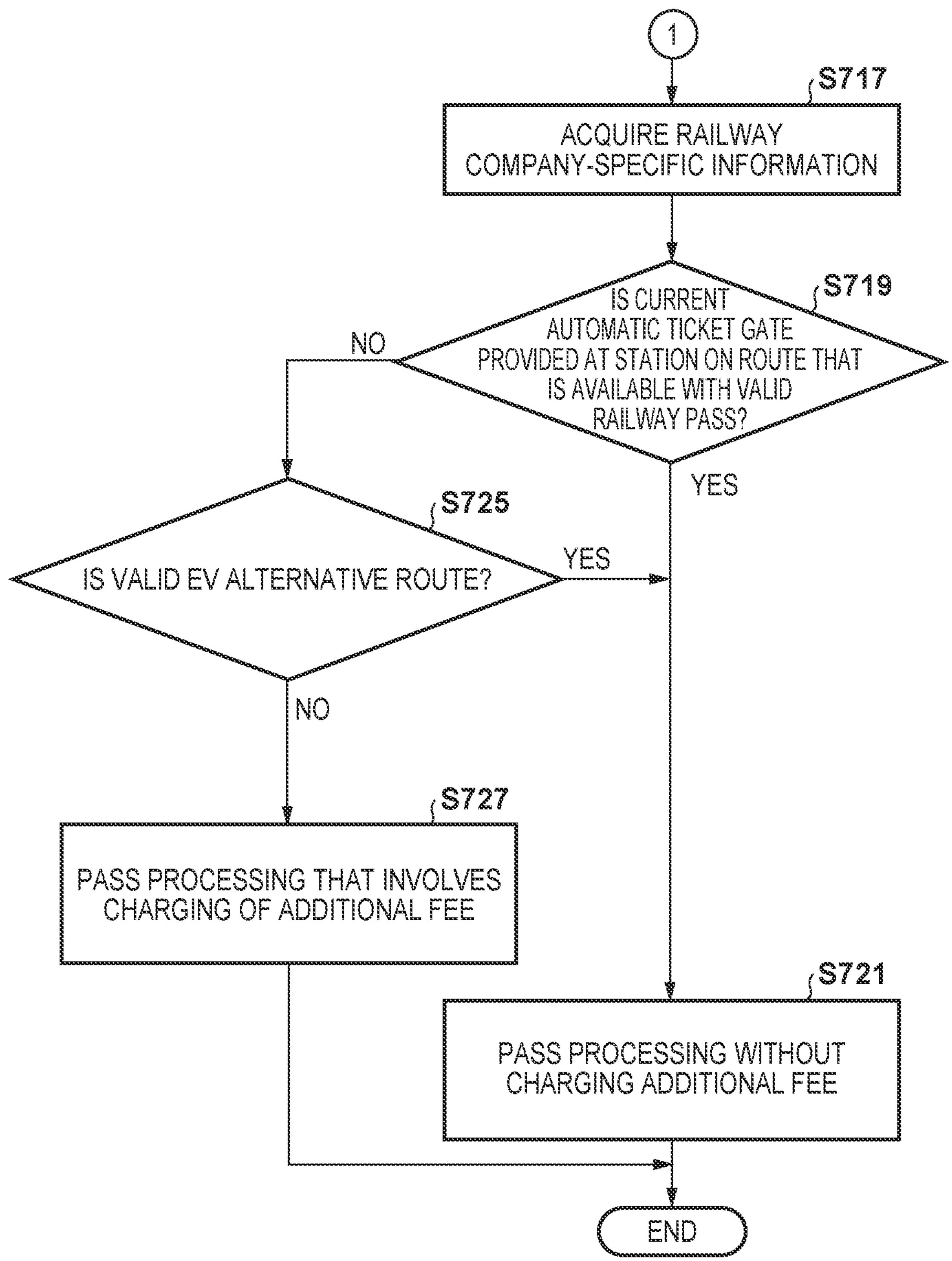
FIG. 7B is a flowchart for a payment processing procedure performed by the automatic ticket gate according to the first embodiment.

Through the procedure shown in FIGS. 4 to 6, the out-of-condition time of the EV pass is recorded in the IC card 250. This out-of-condition time is converted to a fee when the user puts the IC card 250 into the automatic ticket gate 301 to use the railway, and the fee is adjusted at the time of payment. FIGS. 7A and 7B show this procedure. The procedure shown in FIGS. 7A and 7B is performed by the automatic ticket gate 301, especially by the CPU 3011. Upon the user bringing the IC card 250 close to the IC card R/W 3015 of the automatic ticket gate 301, the automatic ticket gate 301 acquires the EV pass-specific information (S703) if it is present (S701-Y). The CPU 3011 determines whether or not the current time is the time to perform payment, with reference to the payment time 2545 included therein (S707). If the current time is not the time to perform payment, processing branches to step S717. For example, if the payment time indicates immediate payment, the current time is necessarily determined as the time to perform payment in step S707. If a designated date is set to the payment time, the CPU 3011 determines whether or not the current date is the designated date. If the current date is the designated date, the CPU 3011 determines that the current time is the time to perform payment.

If the current time is the time to perform payment, the CPU 3011 converts the out-of-condition time to an out-of-condition fee (S709). To perform conversion, a fee per unit time is determined in advance, and the CPU 3011 multiplies the out-of-condition time by the fee per unit time. Next, the CPU 3011 acquires the electronic money information 252, and determines whether or not the remaining amount of electronic money is sufficient to pay the fee calculated in step S709 (S711). If there is a sufficient amount of electronic money remaining, the out-of-condition fee is subtracted from the electronic money information 252, and the out-of-condition time recorded in the temporary memory 2546 is deleted (S713). Furthermore, the CPU 3011 transmits details recorded in the IC card 250, such as the check-in and check-out positions and times, the adjusted out-of-condition fee, the positions and the times that have been determined as being out of the conditions, to the server 310 (S715). The sever holds the details for a certain period of time. On the other hand, if the remaining amount of electronic money is not sufficient in step S711, the CPU 3011 outputs a warning indicating that the remaining amount of electronic money is insufficient (S723). In this case the gate does not open and the user cannot pass through the gate until fee adjustment is performed.

Upon the fee adjustment for the EV pass being complete, or if the current time is not the time to perform payment, railway pass processing is performed. However, in the present embodiment, an alternative route for the EV may be permitted, and processing for this purpose is performed. First, the CPU 3011 acquires railway company-specific information (S717). The CPU 3011 determines whether or not the current automatic ticket gate 301 is provided at the station on the route that is available with the valid railway pass (S719). Upon determining affirmatively, the CPU 3011 performs railway pass processing without charging an additional fee (S721). On the other hand, upon determining negatively in step S719, the CPU 3011 reads the EV alternative route 2544 included in the EV pass-specific information 254, and determines whether or not the current station is a valid station on the EV alternative route (S725). If it is determined affirmatively, processing branches to step S721, and the user is permitted to ride on a train without paying an additional fee. However, if the current station is not on the EV alternative route, the CPU 3011 performs pass processing that involves charging of an additional fee (S727). Note that step S727 includes processing for a case in which a railway pass is not set. In such a case, the fee for the entire section that has been traveled is charged to the user. Also, in step S727, an additional fee is set such that the fee for the EV alternative route is not charged to the user.

As described above, according to the present embodiment, the user can purchase a commuter pass by paying the set fee according to the section and period for which the user wishes to use the pass, in the same manner as in the cases of railway and bus passes, and use a two-wheeled electric vehicle. Also, the out-of-condition use is not restricted, and an additional fee is charged instead. Therefore, the convenience of EVs does not degrade. Note that the positions acquired through the processing in FIG. 5, which are used to determine whether not the positions are on the route, may be recorded as a log, and copied to the IC card 250 in check-out processing. Also, not only the positions, the times at which the positions were acquired may also be recorded as a log. With this configuration, it is possible to record the route and the points in time regarding the travel performed using the EV 101, and explicitly show the details of an excess fee. Although the automatic ticket gate 301 performs payment adjustment regarding an excess fee in the present embodiment, the automatic ticket gate 301 may transmit information regarding the EV pass to the server 310, and the server 310 may perform the processing in FIGS. 7A and 7B, for example.

Also, a route that passes through a commercial facility or the like affiliated with the provider of the EV pass may be set as the EV alternative route, for example. With such a setting, an additional fee is not charged for the detour to the affiliated commercial facility, and therefore the effect of sales promotion can be expected. Also, for this reason, it is possible not to determine the route in advance, and employ a configuration with which the user can avoid being charged by only stopping at the facility. For this purpose, for example, a flag or the like is set so as to indicate that, even if the timer for measuring the out-of-condition time has been started up, if the user stops at the position of a predetermined facility (if a predetermined period of time has elapsed at the predetermined position), the measured out-of-condition time is to be discarded. When the out-of-condition time is to be confirmed (in S507, S607, or the like), the flag is referenced, and if the flag is set, the measured out-of-condition time is discarded. With this configuration, the user is allowed to avoid paying an additional fee when stopping at the predetermined facility, regardless the route.

Modification of First Embodiment

In the first embodiment, travelling along the route is one of the conditions of use, and an additional fee is charged according to the period of time for which the user has deviated from the route. However, in step S409 in FIG. 4 and step S513 in FIG. 5, instead of time measurement being started, a value indicated by the odometer 2011*b* may be read and stored. In step S507 in FIG. 5 and step S607 in FIG. 6, instead of time measurement being stopped, a value indicated by the odometer 2011*b* may be read, and the stored value of travel distance is subtracted therefrom. Thus, it is possible to specify the distance for which the EV has deviated from the route, instead of the time for which the user has deviated from the route. In step S709 in FIG. 7A, the distance for which the EV has traveled off the route is converted to a fee, instead of the out-of-condition time. With such a configuration, it is possible to record the distance of the travel that does not meet the conditions as movement information, and determine an additional fee based on the distance.

Although an additional fee is paid using electronic money in the description above, another method may be used. For example, if an IC card commuter pass has a point card function, it is possible to pay an additional fee by subtracting a point therefrom. In addition, for example, it is possible to allow payment by a credit card, cash, virtual currency, or the like, using a ticket vending machine for a commuter pass, or at a ticket office. Also, it is possible not to verify whether the EVIDs are the same in check-in processing, and the user may be authenticated as an EV rental user. For the authentication, for example, information indicating that the user is an EV rental user is recorded in an IC card, and the EV control unit 200 references the information to authenticate the user. If authentication is successful, EV control unit 200 powers on the EV and permits the user to use the EV. As a result, the user can freely use the EV to be rented, the EV can be shared, and the costs of the EV provided for rental can be recovered in a shorter period of time.

Second Embodiment

Next, a second embodiment will be described. The constituent elements and the entire configuration of the EV use management system are the same as those in the first embodiment. The second embodiment is different from the first embodiment in that FIGS. 4 and 6 are respectively replaced with FIGS. 8 and 9 and the processing in FIG. 5 performed during travel of the EV is not performed. In the present embodiment, the route during travel is not managed, and only the distance is managed.

Check-in Processing

Figure 8:
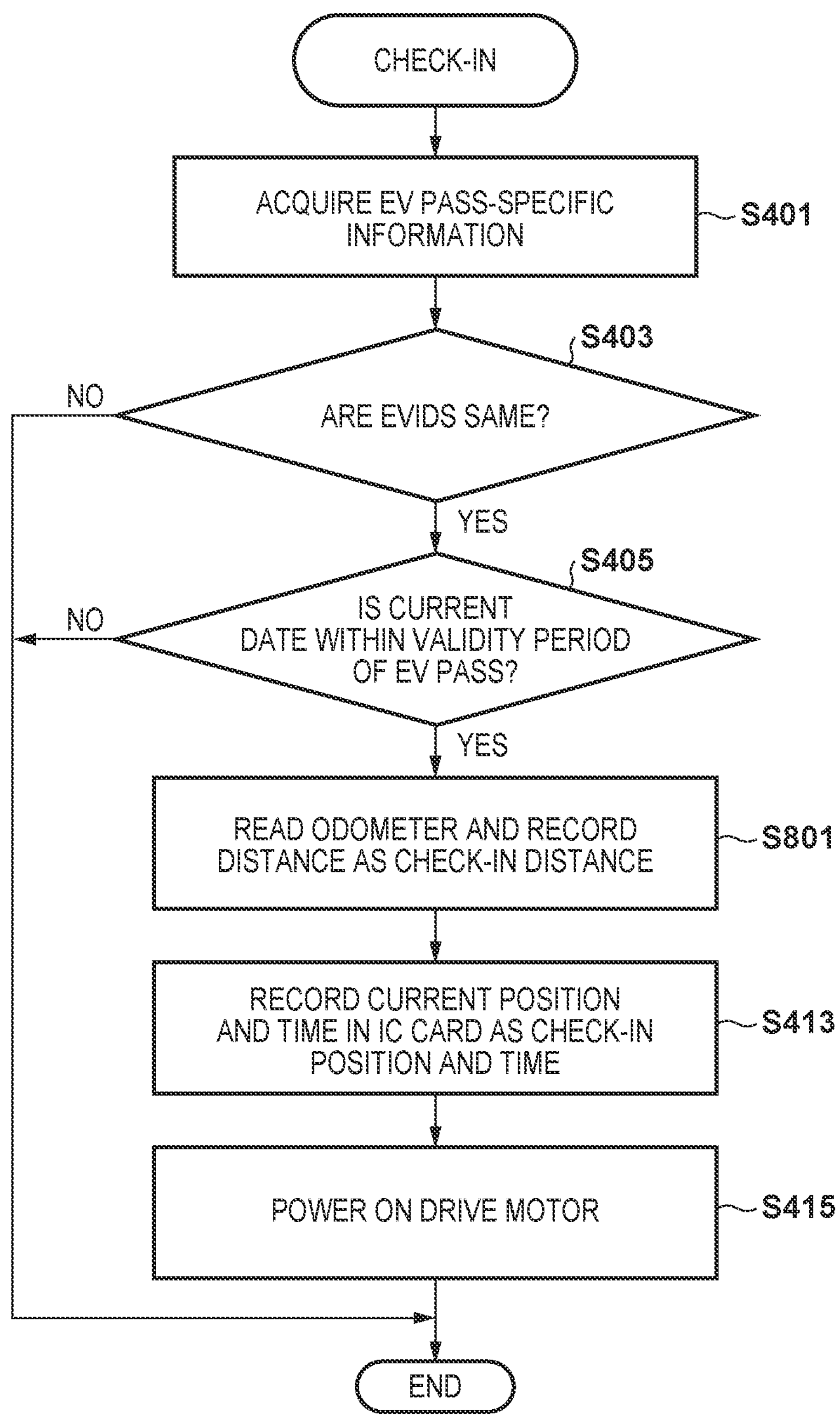
FIG. 8 is a flowchart for a check-in processing procedure performed by a two-wheeled EV according to a second embodiment.

FIG. 8 shows check-in processing according to the present embodiment. This processing is performed by the EV control unit 200, especially by the CPU 211. The CPU 211 first acquires the EV pass-specific information 254 from the IC card 250 (S401). Upon successfully acquiring the EV pass-specific information 254, the CPU 211 compares the EVID 2543 included therein with an EVID 2131 stored in the storage 213 (S403). If the IDs are the same, the user is permitted to use the EV 101. In such a case, the CPU 211 determines whether or not the current date is within the validity period 2542 of the EV pass (S405). If the current date is not within the validity period, processing ends. If it is determined that the current date is within the validity period, the CPU 211 reads the odometer 2011*b* and records the distance as a check-in distance (S801). Finally, the current position and time are recorded in the temporary memory 2546 of the IC card 250 as check-in position and time (S413). Note that the EV control unit 200 need not be provided with the GPS 2011*a* because the route is not to be managed. Therefore, if the GPS 2011*a* is not provided, the time is only recorded in step S413. If check-in is successful, the drive motor 215*a* is powered ON, and thus the user can use the EV 101. Through the above procedure, if the EV pass is valid, check-in is permitted.

Check-Out Processing

Figure 9:
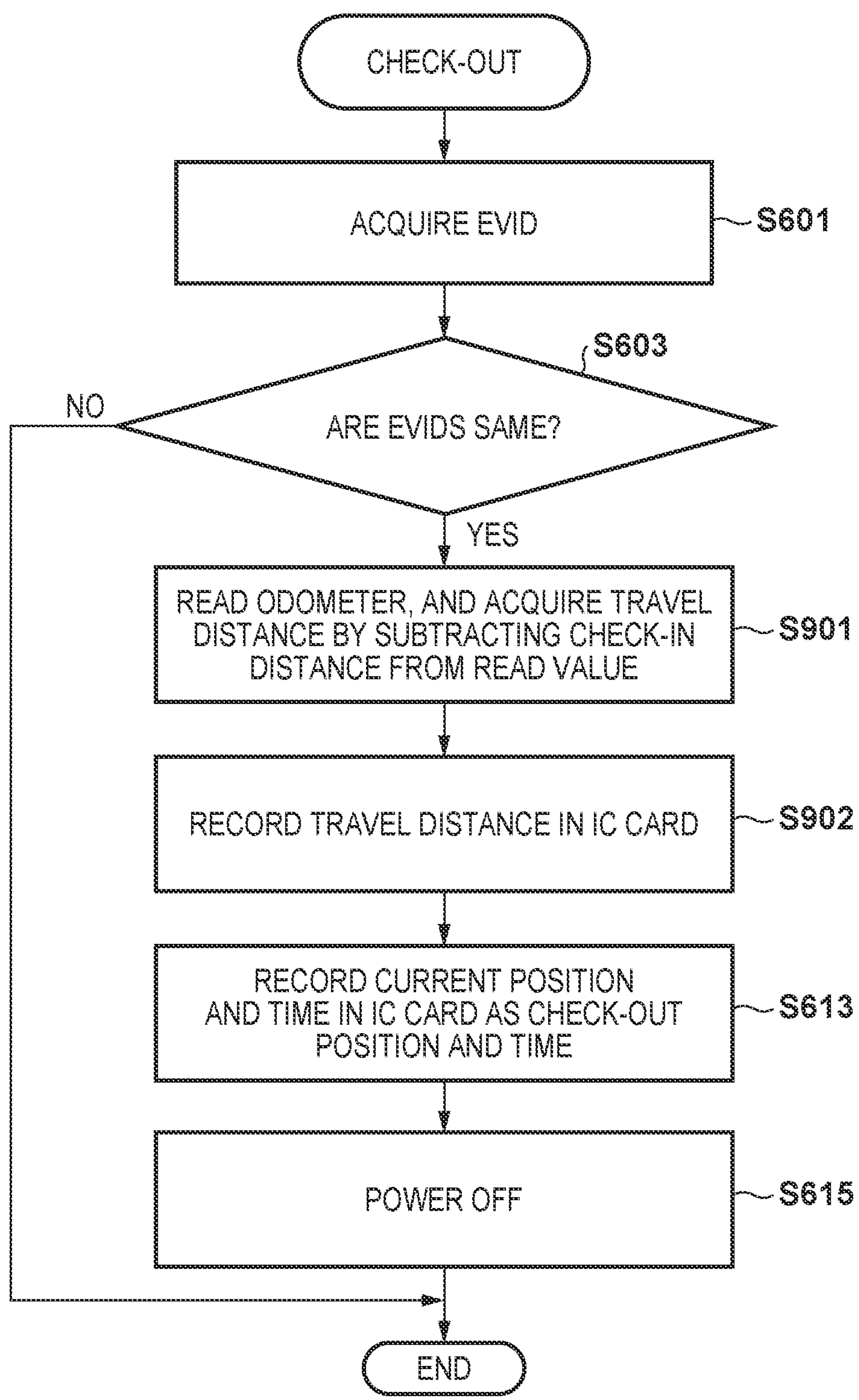
FIG. 9 is a flowchart for a check-out processing procedure performed by the two-wheeled EV according to the second embodiment.

Next, check-out processing performed when the use of the EV 101 is terminated will be described with reference to FIG. 9. This processing is performed by the EV control unit 200, especially by the CPU 211. The CPU 211 first acquires the EV pass-specific information 254 from the IC card 250 (S601). Upon successfully acquiring the EV pass-specific information 254, the CPU 211 compares the EVID 2543 included therein with the EVID 2131 stored in the storage 213 (S603). If the IDs are the same, the CPU 211 reads the odometer 2011*b*, and obtains the travel distance by subtracting the recorded check-in distance from the read value (S901). The CPU 211 records the travel distance in the IC card 250 (S902). The information recorded in step S902 is the movement information in this example. Then, the current position and time are recorded in the IC card 250 as a check-out position and time (S613). Finally, the main power is turned off so that the drive motor 215*a* is also turned off (S615).

In the ticket gate processing shown in FIG. 7A, in step S709, the CPU 3011 determines whether or not the travel distance recorded in step S901 is greater than the travel distance from the check-in to the check-out (the maximum travel distance 3013*b* shown in FIG. 3) determined in advance as a condition of use of the EV pass. If it is greater, the CPU 3011 converts the excessive distance to an additional fee. The maximum travel distance 3013*b* determined in advance may be recorded in the IC card 250. If the automatic ticket gate 301 is to store the maximum travel distance 3013*b*, the automatic ticket gate 301 stores the maximum travel distance 3013*b* for each user. With such a configuration, in the present embodiment, it is possible to more easily manage the use of an EV with an EV pass, without monitoring the travel route.

Modification 1 of Second Embodiment

In the second embodiment, the travel distance from check-in to check-out is determined as a condition of use of the EV pass, and an additional fee is charged for the excessive distance beyond it. Instead, a travel time from check-in to check-out may be determined, and an additional fee may be charged for the excessive time beyond it. If this is the case the excessive time is the movement information. Therefore, in FIGS. 8 and 9, a clock or a timer is read instead of the odometer 2011*b*, and thus the time from check-in to check-out is calculated. If the time exceeds the predetermined time (the maximum travel time 3013*a* in FIG. 3), an additional fee may be charged for the excessive time.

Modification 2 of Second Embodiment

In the second embodiment, the travel distance from check-in to check-out is determined as a condition of use of the EV pass, and an additional fee is charged for the excessive distance beyond it. Instead, a maximum travel distance traveled within a certain period may be determined as a condition of use of the EV pass, and if the total travel distance traveled within the certain period exceeds the maximum travel distance, an additional fee may be charged for the excessive distance. For this purpose, the EV control unit 200 does not read the odometer 2011*b* at check-in or check-out. Instead, the EV control unit 200 determines whether or not it is the start date of the predetermined period, and if it is the start date, the EV control unit 200 reads the travel distance at the start date of the period from the odometer 2011*b*. Also, the EV control unit 200 subtracts the already-stored travel distance of the first day of the previous period from the read travel distance of the first day of the period, and stores the resulting distance in the storage. In addition, the EV control unit 200 also stores the read travel distance in the storage as a travel distance on the first day of the next period. Thereafter, at the first check-out, the EV control unit 200 copies the obtained travel distance to the IC card 250. If this is the case, this travel distance is the movement information. If the travel distance is greater than the distance determined as a condition of use of the EV pass, the automatic ticket gate 301 charges an additional fee corresponding to the excessive distance to the user, and the user pays the fee with electronic money, for example. Of course, the user need not necessarily use electronic money to pay the fee, and may use cash, a credit card, virtual currency, or the like, at a place other than the ticket gate, such as at a ticket vending machine for a commuter pass.

With such a configuration, according to this modification of the embodiment, the condition of use of the EV pass is relaxed and the user can more flexibly use the EV. Also, in the present embodiment, in order to allow users to share the EV, it is necessary to store a total travel distance for each user. Therefore, it is possible to employ a configuration with which a total travel distance is copied from the EV control unit 200 to the IC card 250 at each check-out, and is written back from the IC card 250 to the EV control unit 200 at each check-in. With such a configuration, it is possible to manage a total travel distance for each user, and, in addition, allow a plurality of users to share one EV.

Summary of Embodiments

The above-described embodiments are summarized as follows.

(1) A first aspect is a use management system for a moving body, including:

a moving body on which a user rides;

a storage medium that can store identification information, contract information that is associated with the iden tification information, and movement information regarding the moving body; and an information processing apparatus, wherein the moving body includes reader/writer means for acquiring information from the storage medium and records information onto the storage medium, starts recording the movement information regarding the moving body upon the identification information being acquired by the reader/writer means at a first point in time at which the use of the moving body is started, and writes the recorded movement information onto the storage medium using the reader/writer means upon the identification information being the reader/writer means at a second point in time at which the use of the moving body is ended, and the information processing apparatus includes reader/writer means for acquiring information from the storage medium and records information onto the storage medium, determines whether or not the movement information meets conditions indicated by the contract information by comparing the contract information associated with the identification information, with the movement information, upon acquiring the contract information and the movement information from the storage medium, and charges an additional fee to the user upon determining that the conditions are not satisfied.

With this configuration, it is possible to allow the user to use the moving body under the conditions determined by contract information, charge an additional fee to the user if the conditions are not satisfied, and allow the user to use the moving body with a commuter pass. The fee need not necessarily be paid by cash, and may be paid using various methods, including a credit card and points equivalent to currency, and virtual currency.

(2) A second aspect is the use management system according to the first aspect, wherein the conditions include a validity period and a route, and the movement information includes a period of time for which the moving body has deviated from the predetermined route.

With this configuration, it is possible to allow the user to use the moving body with a commuter pass that defines a validity period and a route, and charge an additional fee according to the period of time for which the user has traveled beyond the conditions.

(3) A third aspect is the use management system according to the first aspect, wherein the conditions require that the route be a predetermined route, and the movement information includes a distance by which the moving body has deviated from the predetermined route.

With this configuration, it is possible to allow the user to use the moving body with a commuter pass that defines a validity period and a route, and charge an additional fee according to the distance by which the user has traveled beyond the conditions.

(4) A fourth aspect is the use management system according to the first aspect, wherein the conditions require that a required time that is a period of time from the first point in time to the second period in time be within a predetermined range of time, and the movement information includes the required time.

With this configuration, it is possible to allow the user to use the moving body with a commuter pass that defines a validity period and a route and charge an additional fee according to the excessive period of time.

(5) A fifth aspect is the use management system according to the first aspect, wherein the conditions require that a travel distance traveled from the first point in time to the second point in time be within a predetermined range of distance, or that the travel distance accumulated during a predetermined period of time be within a predetermined range of distance, and the movement information includes the travel distance.

With this configuration, it is possible to allow the user to use the moving body with a commuter pass that defines a validity period and a route, and charge an additional fee according to the excessive distance.

(6) A sixth aspect is the use management system according to the first to fifth aspects, wherein the information processing apparatus is an automatic ticket gate.

With this configuration, it is possible to perform fee adjustment regarding an additional fee for the use of the moving body when the user passes through the automatic ticket gate.

(7) A seventh aspect is the use management system according to the first to fifth aspects, wherein the information processing apparatus is a server that is connected to an automatic ticket gate via communication.

With this configuration, it is possible to perform fee adjustment regarding an additional fee for the use of the moving body, using a function of the server that is not an automatic ticket gate.

(8) An eighth aspect is the use management system according to the first to seventh aspects, wherein a user is allowed to select the timing of paying the additional fee.

With this configuration, it is possible to allow the user to pay the additional fee for the use of the moving body at a timing selected by the user.

(9) A ninth aspect is the use management system according to the first to eighth aspects, wherein the storage medium is a magnetic commuter pass, an IC card commuter pass, or a user terminal belonging to a user.

With this configuration, it is possible to manage the use of the moving body, using a commuter pass or a user terminal.

The present invention is not limited to the above embodiments and various changes and modifications can be made within the spirit and scope of the present invention. Therefore, to apprise the public of the scope of the present invention, the following claims are made.

The invention claimed is:

1. A use management system for a vehicle, comprising:

a vehicle on which a user rides;

a storage medium that can store identification information, contract information that is associated with the identification information and includes a predetermined route, and movement information regarding the vehicle, the movement information including out-of-condition time measured when the vehicle has deviated from the predetermined route, wherein the storage medium is a magnetic commuter pass, an IC card commuter pass, or a user terminal belonging to a user; and an information processing apparatus comprising a processor circuit, wherein the vehicle includes a first reader/writer for acquiring information from the storage medium and records information onto the storage medium, starts recording the movement information regarding the vehicle upon the identification information being acquired by the first reader/writer at a first point in time at which a use of the vehicle is started, records the out-of-condition time when the vehicle deviates from the predetermined route, discards the out-of-condition time recorded when the vehicle deviated from the predetermined route in a case where the vehicle stops at a predetermined position and a predetermined period of time has elapsed at the predetermined position, and writes the movement information onto the storage medium using the first reader/writer upon the identification information being acquired by the first reader/writer at a second point in time at which the use of the vehicle is ended, and the information processing apparatus comprising the processor circuit includes a second reader/writer for acquiring information from the storage medium and records information onto the storage medium, and charges an additional fee to a user that is associated with the identification information, based on the out-of-condition time, upon acquiring the movement information from the storage medium; and wherein the storage medium includes alternative route information that indicates a route of an alternative transportation system for the predetermined route; and the information processing apparatus does not charge an additional fee to the user for the route of the alternative transport system indicated by the alternative route information.

2. The use management system according to claim 1, wherein the information processing apparatus is an automatic ticket gate.

3. The use management system according to claim 1, wherein the information processing apparatus is a server that is connected to an automatic ticket gate via communication.

4. The use management system according to claim 1, wherein the user is allowed to select a timing of paying the additional fee.

* * * * *